United States Patent
Civanlar et al.

(10) Patent No.: US 9,806,983 B2
(45) Date of Patent: Oct. 31, 2017

(54) SYSTEM AND METHOD FOR CONTROL FLOW MANAGEMENT IN SOFTWARE DEFINED NETWORKS

(71) Applicant: ARGELA YAZILIM VE BILISIM TEKNOLOJILERI SAN. VE TIC. A.S., Istanbul (TR)

(72) Inventors: Seyhan Civanlar, Istanbul (TR); Murat Parlakisik, Istanbul (TR); Burak Gorkemli, Istanbul (TR); Erhan Lokman, Istanbul (TR); A Murat Tekalp, Istanbul (TR)

(73) Assignee: ARGELA YAZILIM VE BILISIM TEKNOLOJILERI SAN. VE TIC. A.S. (TR)

( * ) Notice: Subject to any disclaimer, the term of this patent is extended or adjusted under 35 U.S.C. 154(b) by 106 days.

(21) Appl. No.: 14/852,729

(22) Filed: Sep. 14, 2015

(65) Prior Publication Data

US 2017/0078183 A1    Mar. 16, 2017

(51) Int. Cl.
*H04L 12/28* (2006.01)
*H04L 12/751* (2013.01)
*H04L 12/715* (2013.01)
*H04L 12/721* (2013.01)

(52) U.S. Cl.
CPC ............ *H04L 45/02* (2013.01); *H04L 45/64* (2013.01); *H04L 45/38* (2013.01)

(58) Field of Classification Search
CPC .......... H04L 45/02; H04L 45/38; H04L 45/64
See application file for complete search history.

(56) References Cited

U.S. PATENT DOCUMENTS

| | | | |
|---|---|---|---|
| 8,762,501 B2 | 6/2014 | Kempf et al. | |
| 8,964,752 B2* | 2/2015 | Zhang | H04L 45/38 370/392 |
| 9,094,285 B2* | 7/2015 | Gorkemli | H04L 41/12 |
| 9,253,117 B1* | 2/2016 | Poutievski | H04L 41/12 |
| 9,419,874 B2* | 8/2016 | Sun | H04L 43/0829 |
| 2009/0138577 A1 | 5/2009 | Casado et al. | |
| 2012/0044935 A1* | 2/2012 | Hama | H04L 12/4625 370/389 |
| 2013/0223277 A1* | 8/2013 | DeCusatis | H04L 67/1097 370/254 |
| 2014/0211661 A1* | 7/2014 | Gorkemli | H04L 41/12 370/255 |
| 2015/0009830 A1* | 1/2015 | Bisht | H04L 47/125 370/236 |

(Continued)

OTHER PUBLICATIONS

McKeown et al., "OpenFlow: Enabling Innovation in Campus Networks," ACM SIGCOMM Computer Communication Review, 38(2), Apr. 2008, 6pgs.

*Primary Examiner* — Robert Wilson
(74) *Attorney, Agent, or Firm* — IP Authority, LLC; Ramraj Soundararajan

(57) ABSTRACT

A novel (software defined network) SDN control plane is introduced having new system capabilities to activate and deactivate controllers in real-time upon automatic measurement of network control traffic and service requirements, and proper controller interactions with network switches as control plane topology changes. Also introduced is a control flow table, which defines the assignment of certain control flows (by originator, location, service type, etc.) to different controllers within the SDN.

21 Claims, 11 Drawing Sheets

(56) References Cited

U.S. PATENT DOCUMENTS

| | | | |
|---|---|---|---|
| 2015/0113132 A1* | 4/2015 | Srinivas | H04L 41/0816 709/224 |
| 2015/0124812 A1* | 5/2015 | Agarwal | H04L 45/24 370/392 |
| 2015/0154258 A1* | 6/2015 | Xiong | H04L 43/0876 707/718 |
| 2015/0277990 A1* | 10/2015 | Xiong | G06F 9/52 718/106 |
| 2016/0050148 A1* | 2/2016 | Xu | H04L 47/24 370/235 |
| 2016/0080263 A1* | 3/2016 | Park | G06F 17/30345 370/392 |
| 2016/0254984 A1* | 9/2016 | Tekalp | H04L 45/38 |

* cited by examiner

SYSTEM AND METHOD FOR CONTROL FLOW MANAGEMENT IN SOFTWARE DEFINED NETWORKS

BACKGROUND OF THE INVENTION

Field of Invention

The disclosed invention generally relates to the controller component of a Software Defined Network (SDN). The present invention relates specifically to a system and method for a software defined network (SDN) enabling a dynamic control layer by placing, activating, and deactivating controllers, and re-distributing traffic amongst them in real-time as the network's control layer traffic volume and requirements change over time.

Discussion of Related Art

Software-Defined Networking (SDN) is a new paradigm where the control of computer and communication networks is accomplished via programmatic interfaces. There are a number of approaches to SDN. In the most popular approach, the data and control planes that typically reside in a switch are separated and the control plane is moved to a separate device, commonly referred to as the controller as described in the article "OpenFlow: Enabling Innovation in Campus Networks" by Nick McKeown et al., which appeared in ACM SIGCOMM Computer Communication Review, vol. 38, no. 2, April 2008 and also in the Pre-Grant Application by Casado et al. (2009/0138577). When triggered, the controller calculates the most appropriate route through the network between two nodes and programs all switches along this route accordingly. The controller can be a physical server, a virtual machine or an appliance. There can be multiple controllers in a computer network in this approach. It is possible to divide the network into regions and have different controllers control each region. It is also possible to have multiple controllers control a single switch for reliability and/or performance issues, where each controller may control different ports, or different flow types, or flows with different end nodes. In this approach, a well-defined protocol, OpenFlow, is used for communication between the network forwarding devices and the controller. The controller also has a northbound application programming interface so that different, custom control applications that use the OpenFlow data may be installed on the controller. This approach is advocated by the Open Networking Foundation (ONF) that aims to standardize the OpenFlow protocol. The latest version of the OpenFlow protocol may be accessed via the ONF web page. It is also possible to use a protocol other than OpenFlow to enable proper operation of this approach.

The U.S. patent to Kempf et al. (U.S. Pat. No. 8,762,501) discloses implementing a 3G Packet Core in a Cloud Computer with Openflow Data and Control Planes. Kempf et al.'s method implements a general packet radio service (GPRS) tunnel protocol (GTP) in a packet core (PC) of a third generation (3G) network having a split architecture where a control plane of the PC of the 3G network is in a cloud computing system, and where the cloud computing system includes a controller.

Embodiments of the present invention are an improvement over prior art systems and methods.

SUMMARY OF THE INVENTION

The present invention relates generally to a system and method for a software defined network (SDN) enabling a dynamic control layer by placing, activating, and deactivating controllers, and re-distributing traffic amongst them in real-time as the network's control layer traffic volume and requirements change over time. Even several controllers can simultaneously serve a switch, if needed. It also describes how switches and controllers interact as aforementioned control plane network topology changes over time. In particular, this invention relates to a system and method for constantly tracking the control plane workload and network service requirements, and accordingly reconfiguring the switches and control plane connections of the SDN, and re-distributing control traffic or deploying service specific controllers. Such a dynamic control plane can be handled most effectively as a cloud service, as described in this patent application, although other service alternatives are equally applicable.

In one embodiment, the present invention provides a method to dynamically reconfigure a software defined network (SDN) domain's control plane when a new controller is needed, the method comprising: when needed, activating a new controller in the SDN; determining a control flow table to assign a control traffic flow group to the new controller in the SDN; sending the control flow table to one or more switches in SDN, and wherein the switches discover the new controller and reroutes control traffic to the new controller according to the control flow table.

In another embodiment, the present invention provides a method to dynamically reconfigure a software defined network (SDN) domain's control plane comprising: attaching a switch in the SDN directly to both a first controller and a second controller in the SDN; receiving a control flow routing table at the switch; and temporarily routing a first subset of control flows from the switch to the first controller and temporarily routing a second subset of control flows to the second controller.

In another embodiment, the present invention provides a method to dynamically reconfigure a software defined network (SDN) domain's control plane comprising: attaching a first switch in the SDN to a first controller in the SDN; indirectly attaching the first switch to a second controller in the SDN via a second switch; receiving a first control flow routing table at the first switch and a second control flow routing table at the second switch; and routing a first portion of control flows defined in the first control flow routing table from the first switch to the first controller and routing a second portion of control flows defined in the second control flow routing table to the second switch, which in turn routes the second portion of control flows to the second controller.

In another embodiment, the present invention provides a method to dynamically reconfigure a software defined network (SDN) domain's control plane comprising: identifying when a switch is disconnected from a first controller; directly reconnecting the switch to a second controller; receiving a control flow routing table at the switch, and sending control flows by the switch to the second controller as defined in the control flow routing table; and identifying when the switch is reconnected to the first controller and disconnecting the switch from the second controller so that only one controller serves the switch.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be consid

DESCRIPTION OF THE PREFERRED EMBODIMENTS

Figure 1:
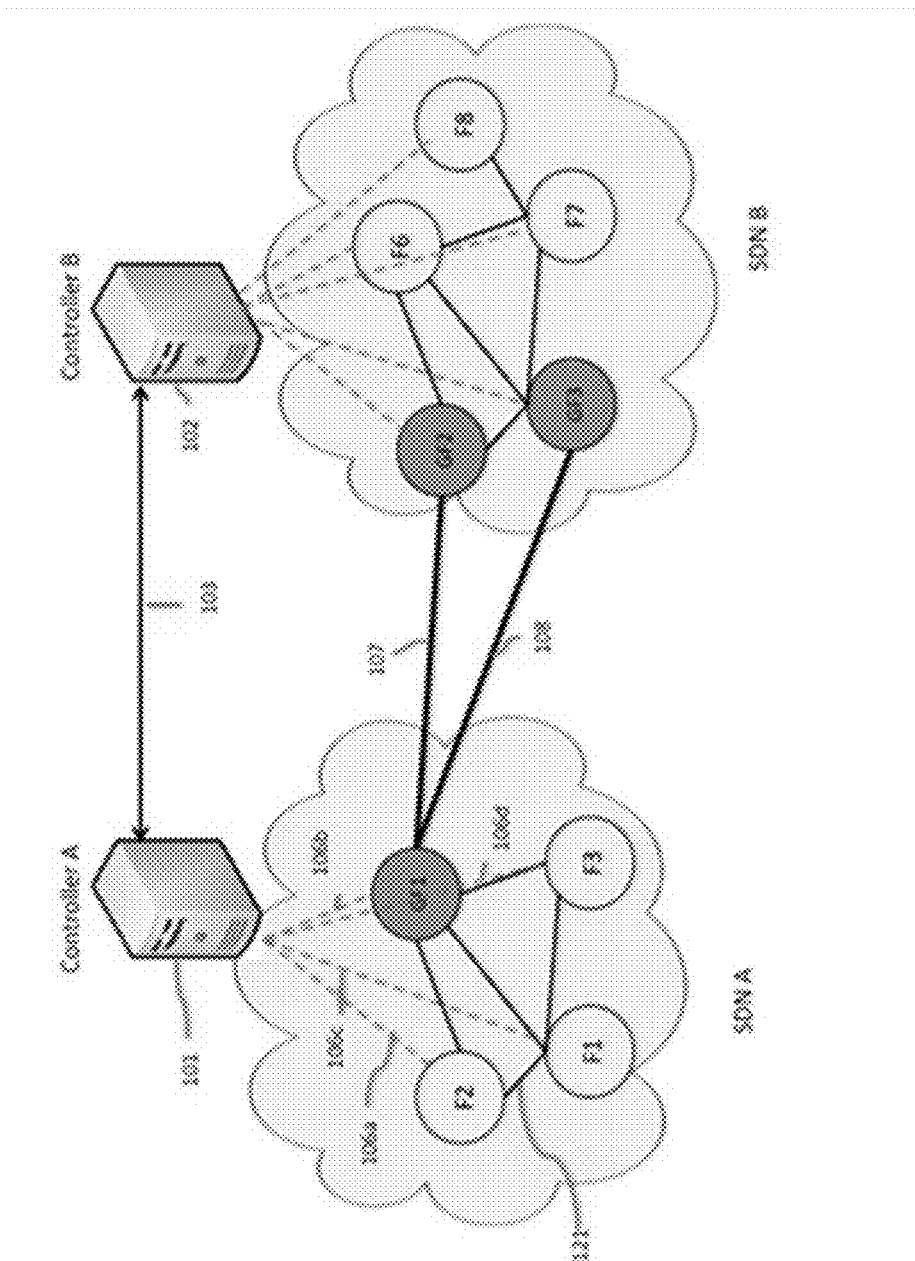
- FIG. 1 illustrates a high level diagram of a prior art illustrating key components of a typical SDN.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

SDN is a new approach for IP networking that allows decoupling of control and data planes. Decisions about traffic routing are performed at the control plane, while traffic forwarding according to the rules determined by the control plane is performed at the data plane. An SDN controller is the software where control plane decisions are performed. It may reside in a single computer or may be distributed to many computers. SDN applications are written in or on the SDN controller, which enable management of data plane routes differently based on specific application needs.

SDN controller is a logically centralized entity in charge of (i) translating the requirements from the SDN application down to the data path and (ii) providing applications with a summarized view of the network (which may include statistics and events). It is mainly comprised of a control logic, a control to data-plane interface, and an API set for applications to use or program the SDN controller. Definition as a logically centralized entity neither prescribes nor precludes implementation details such as the federation of multiple controllers, the hierarchical connection of controllers, communication interfaces between controllers, nor virtualization or slicing of network resources. A possible control-to-data-Plane interface is OpenFlow defined by the Open Networking Foundation, ONF (see https://www.opennetworking.org).

The SDN data plane is where forwarding and data processing is performed. A data plane entity is a so-called forwarder, which contains one or more traffic forwarding engines with traffic processing functions, an interface to the SDN controller to receive control decisions and to send measurements on data plane.

The SDN control-to-data is the interface defined between an SDN controller and a forwarder, which provides at least (i) programmatic control of all forwarding operations, (ii) capabilities advertisement, (iii) statistics reporting, and (iv) event notification. SDN requires a method for the control plane to communicate with the data plane. One such mechanism is OpenFlow, which is often misunderstood to be equivalent to SDN, but other mechanisms/protocols could also fit into the concept. Therefore, this patent application is not reliant on the OpenFlow protocol.

SDN controller also has a north-bound interface towards SDN applications and typically provides abstract network views and enables direct expression of network behavior and requirements. This is a possible interface to use, although other implementations are also viable.

For the purposes of this invention, a prior art SDN domain is comprised of a controller, and many forwarders controlled by said controller. Illustrated in FIG. 1 is a simple exemplifying network with two SDN domains A and B, where domain A is controlled by controller A (101) and domain B is controlled by controller B (102).

The network of SDN A's data plane is comprised of forwarders F1, F2, F3 and GF1 where F1, F2 and F3 are so-called internal forwarders (i.e., has only connectivity to other forwarders within the same domain), while GF1 is a gateway forwarder (i.e., has at least one connectivity to at least one forwarder in another SDN's domain; SDN B in this specific case). Note that, similarly, SDN B's data plane is comprised of internal forwarders F6, F7 and F8, and gateway forwarders GF2 and GF3, both of which connects to GF1 of SDN domain A with interconnection links 107 and 108, respectively. These two links are called inter-SDN links (also known in the public Internet as peering-links), while links such as those between F1 and F2, are called intra-SDN links.

SDN controller 101 attaches to F1, F2, F3 and GF1 with links labeled 106a-d with a control-to-data plane interface running a control-to-data plane protocol such as OpenFlow. Similarly, controller 102 attaches to forwarders of SDN Domain B, communicating with a protocol such as OpenFlow. Meanwhile, controllers 101 and 102 are attached to each other with link 103 to exchange control plane information regarding their respective domains.

Cloud services refer to applications, resources and services that are fully managed by a service provider and made available on demand via the Internet from remote servers as opposed to being provided from local servers at own on-premises. A cloud service should provide easy and scalable access, and should dynamically scale to meet the needs of its users. There's no need for a company to provision or deploy its own resources or allocate IT staff to manage the service since the cloud service provider supplies the hardware and software necessary for the service.

Examples of cloud services available today include online data storage and backup solutions, Web-based e-mail services, document collaboration services, database processing, managed technical support services. However, there is no technical methodology or service to provide single or multiple-domain SDN controller logic and inter-domain flow path management as a cloud service. We envisioned that since control layer will be dynamic a cloud service would be the best fit.

The present invention generally defines a new type of SDN control plane. This control plane has new system capabilities to activate and deactivate controllers in real-time upon automatic measurement of network control traffic and service requirements, and proper controller interactions with network switches as control plane topology changes. The motivation for a dynamic control plane can be one or more of the following: (1) Increase in volume of traffic between a controller and the data plane switches because of network growth; (2) Temporary or permanent packet processing overload within a controller; (3) Increase in control traffic volume; (4) Specific type of high volume traffic that must be processed by a controller.

The system capabilities are monitoring certain control traffic/load indicators, determining required number and location of new controllers, activating/deactivating controllers, enabling switches to discover newly assigned controllers, and re-distributing control traffic amongst controllers. As part of the re-distribution task, it may, for example, assign groups of forwarders to a new controller to offload an existing controller on a permanent or temporary basis, or assign multiple controllers to a single switch to split control traffic on a per-flow basis, or assign multiple controllers to a group of switches in which one of said controllers for example handles only a specific type of control traffic, etc. As such, this invention introduces for the first time control flow table concept, which defines the assignment of certain control flows (by originator, location, service type, etc.) to different controllers.

Each Controller in the SDN can send a 'server status' message defined in prior-art to the system of this invention. This message includes information on controller's current status, such as the indicators of control layer traffic load. Although this information is available in the prior art, it is not well defined how it can be utilized to create new instances of controllers in real-time. Using the information extracted from the 'server status' message (or possibly other similar messages), system of our invention may also decommission one or more controllers because of reduced network load in order to save energy and reduce cost of operation depending on the current load.

Figure 2:
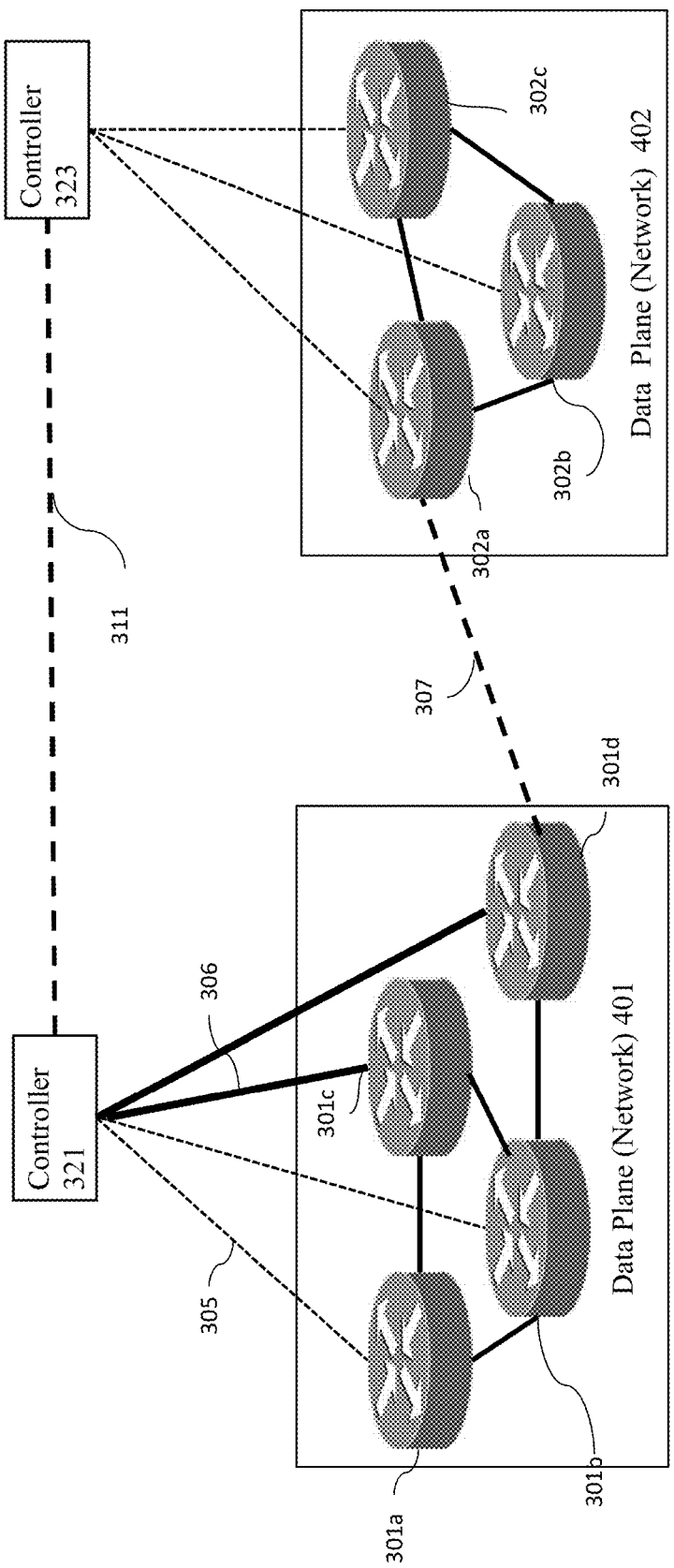
FIG. 2 illustrates an exemplifying high-level diagram of two SDNs with an overloaded control plane.

In order to describe the general operations of the system of invention, an exemplifying SDN shown in FIG. 2 is used. In this small network, there are two data plane networks, namely networks 401 and 402. These two data plane networks may belong to the same SDN or different SDNs, and are interconnected with link 307. Network 401 is controlled by Controller 321. Likewise, network 402 is controlled by Controller 323. Controllers 321 and 323 are interconnected with link 311 to exchange control information (such as routing tables) and form the control network. Although the two SDNs may possibly be isolated from one another forming two islands (i.e., links 307 and 311 do not exist), we assumed that they are interconnected, just for practical purposes.

Figure 3:
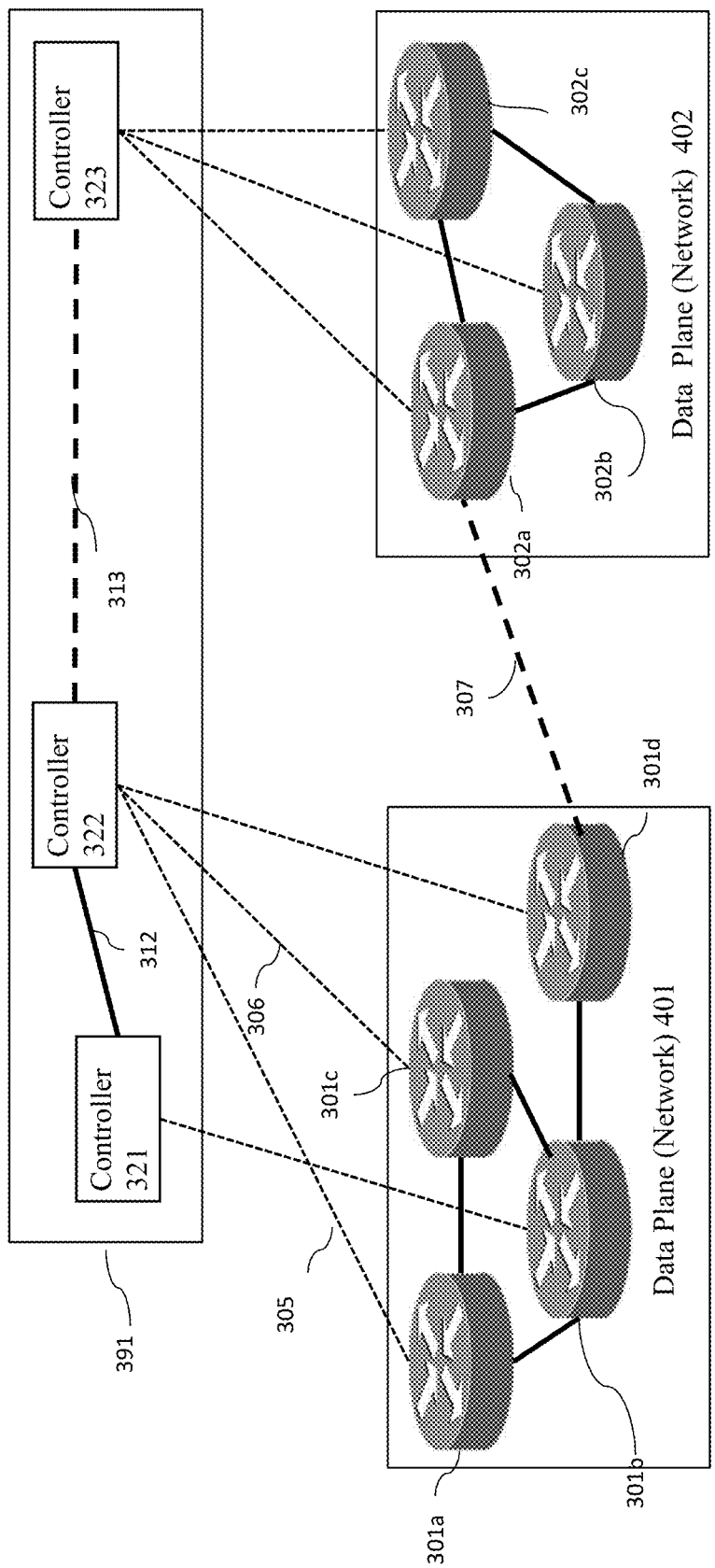
FIG. 3 illustrates an exemplifying high-level diagram of two SDNs of FIG. 2 after activation of a new Controller to alleviate the extra load.

Controller 321 is overloaded in this scenario because of traffic volume on links that connect to forwarders 301c and 301d. The overload condition may arise because of data traffic that is routed to the controller for deep packet inspection (DPI) or could simply be a special event that creates traffic impact these two links. In this scenario a new Controller 322 is activated as shown in FIG. 3. After the activation, two key processes must take place: (1) Controllers 321 and 323 must discover the new Controller and attach to it, and (2) Forwarders 301c and 301d must be disconnected from Controller 321 and reconnect with new Controller 322. According to FIG. 3, Controller 321 attaches to Controller 322 with new link 312. Likewise, Controller 323 also attaches to Controller 322 with new link 313. Also note that the overloaded connections from forwarders 301c and 301d are now attached to Controller 322 removing the load from Controller 321. Although control network connections 312 and 313 are shown as directly connecting to Controllers, they may actually be, for example, connections (wired, cellular, wireless) between LAN switches of data centers in which the physical servers that house controllers reside. Therefore, the establishment of new interconnections between the controllers, as new Controllers are activated and deactivated, does not require provisioning and activation/deactivation of new facilities. Similarly, we assumed that facilities such as 306 can be instantly provisioned either because the new controller is located in the same data center as the overloaded controller (and, hence, the Wide Area Network (WAN) facilities are the same), or if the new controller is located in another data center, then the forwarders are dual-homed to multiple data centers. Obviously, the transmission facilities infrastructure must be in place to support activation of new Controllers and shifting of traffic over different or same facilities from the old Controller to the new Controller.

Control Layer Traffic Distribution

When it comes to how control layer traffic load must be distributed amongst many controllers, we envisioned various plausible scenarios as illustrated in FIGS. 4a-d. Although we covered these scenarios here, other similar scenarios can also be easily derived.

Total Control Flow Shifting (see FIG. 4a)—

In this scenario, a new controller is created, and thereafter one or more of the switches are disconnected from their previous controller and reconnected to the new controller. This causes the entire control layer load created by a switch to be rerouted to another controller to offload the controller it was previously connected.

Control Flow Splitting (see FIG. 4b)—

In this scenario, only a specific type of control traffic is routed (in the form of a flow group) to the newly created controller, while the remainder of the control traffic continues to be served by the original controller. This scenario implies that the switch is served by two controllers at the same time. The specific type of traffic can be, for example, any stream that requires deep packet inspection (DPI).

Control Flow Rerouting (see FIG. 4c)—

In this scenario, only a specific type of control traffic is re-routed (in the form of a flow group) (i) towards another switch along the data plane, which is serviced by another controller, or (ii) towards another controller within the control plane. The remainder of the control traffic continues to be served by the original controller. This scenario also implies that the switch is served by two controllers at the same time. However, a direct connection from the switch to the new controller is not required. The specific type of traffic can be, for example, any stream that requires deep packet inspection (DPI).

Service-Specific Controller (see FIG. 4d)—

In this scenario, a new controller is created for service-specific control traffic (in the form of a flow group). The remainder of the control traffic continues to be served by the original controller. This scenario also implies that the switch is served by two controllers at the same time, one controller for the general type of controller traffic, and another controller for service-specific control flows. The specific type of traffic can be, for example, any stream that requires deep packet inspection (DPI) or specific video service or a network firewall service. The main difference between this scenario and the previous two scenarios is that the service specific controller serves possibly all switches on a permanent or on-demand basis.

Control Traffic Flow Table Concept

Routing tables and flow tables are only applicable to data plane traffic in prior art. The concepts of control plane traffic re-routing according to the scenarios described above requires defining control traffic routing and flow tables. These tables are created by the system of the present invention, and distributed to network switches (and some of the controllers if only one of the controllers is determining the control routing table) through a controller, to inform them on which control flows are to be sent to which controller. The default setting would of course be sending all control traffic to a single controller as in legacy SDN.

Figure 4A:
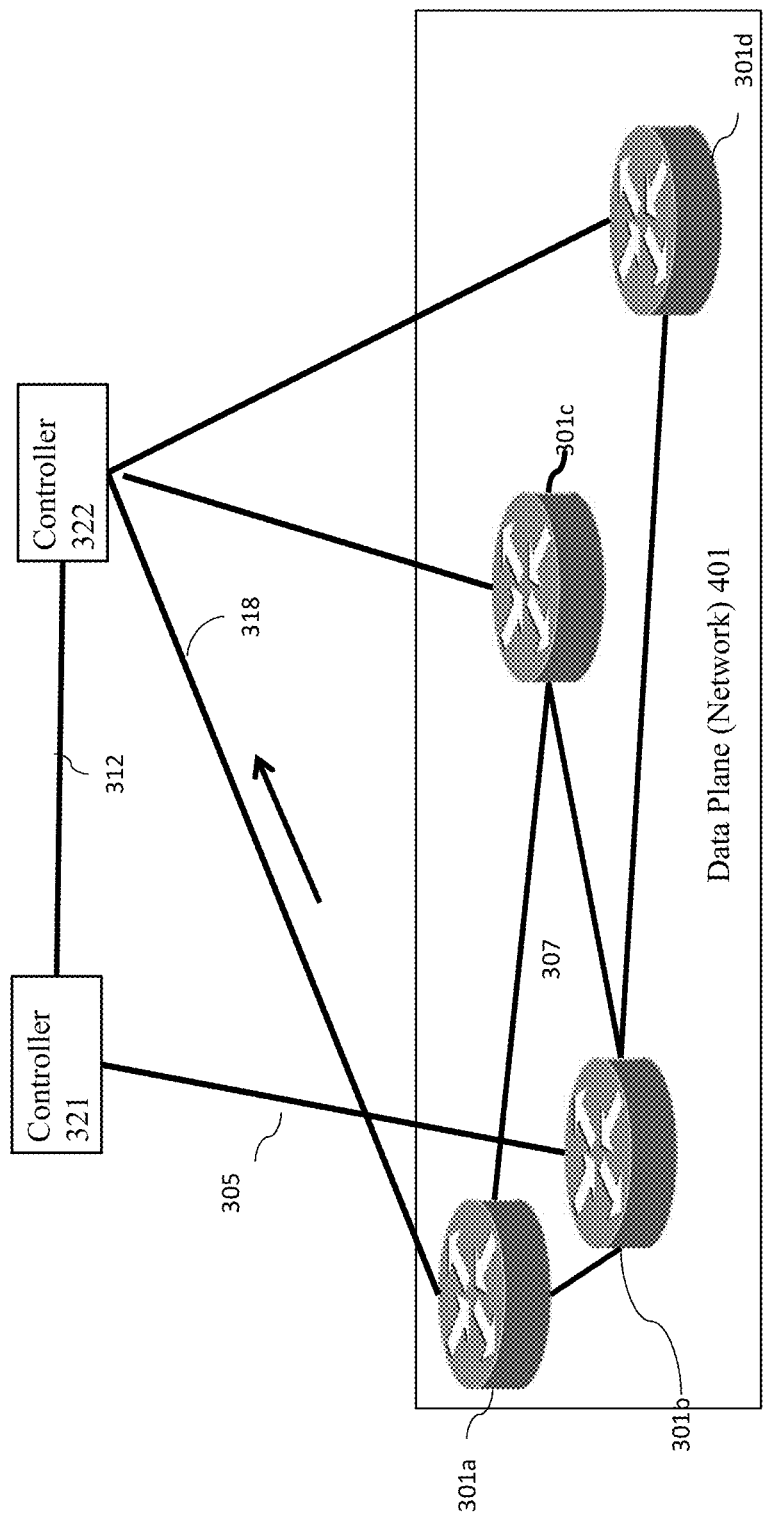
FIGS. 4a-d illustrate four scenarios of switch-to-controller interactions for control traffic redistribution.
Figure 4B:
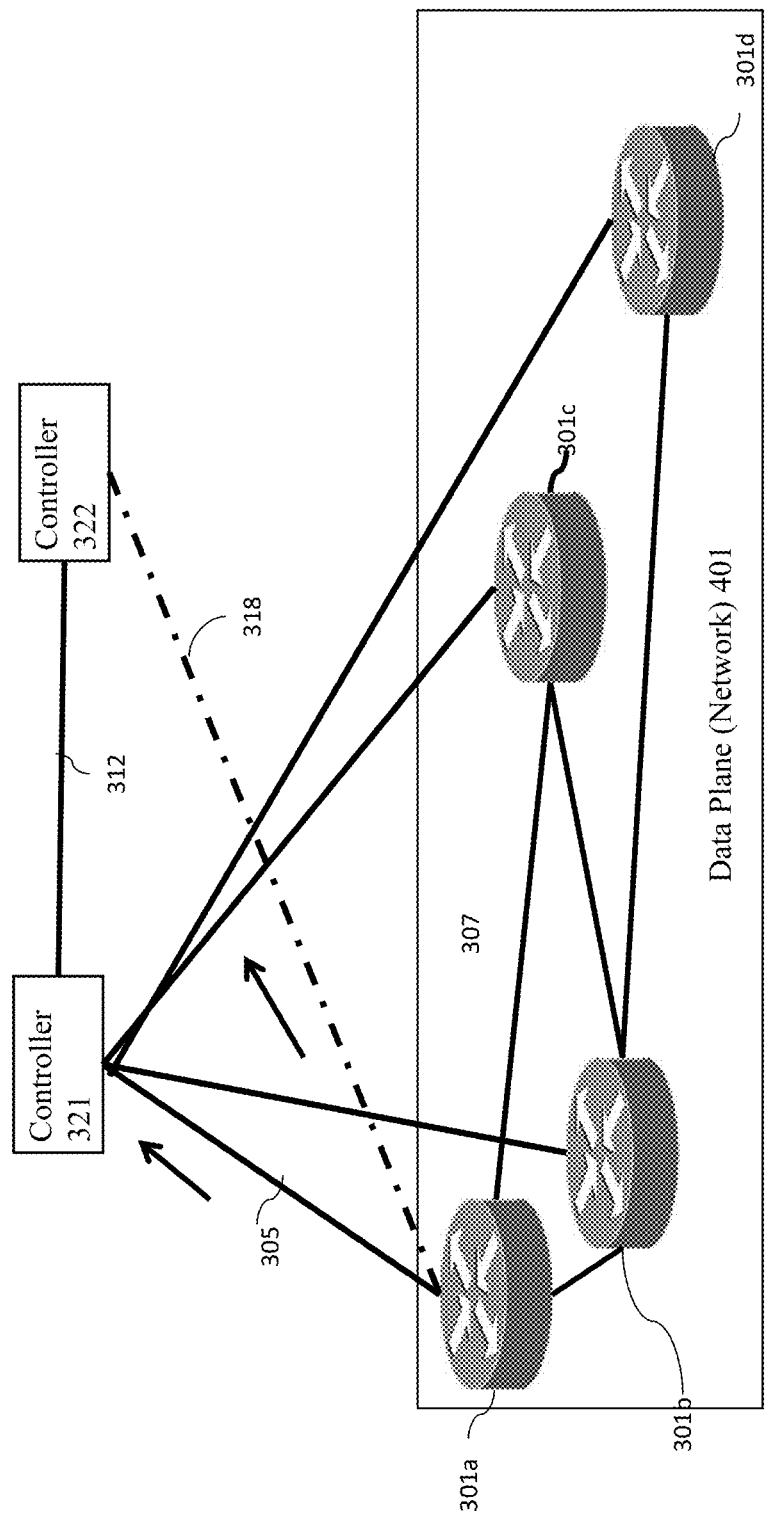
Figure 4C:
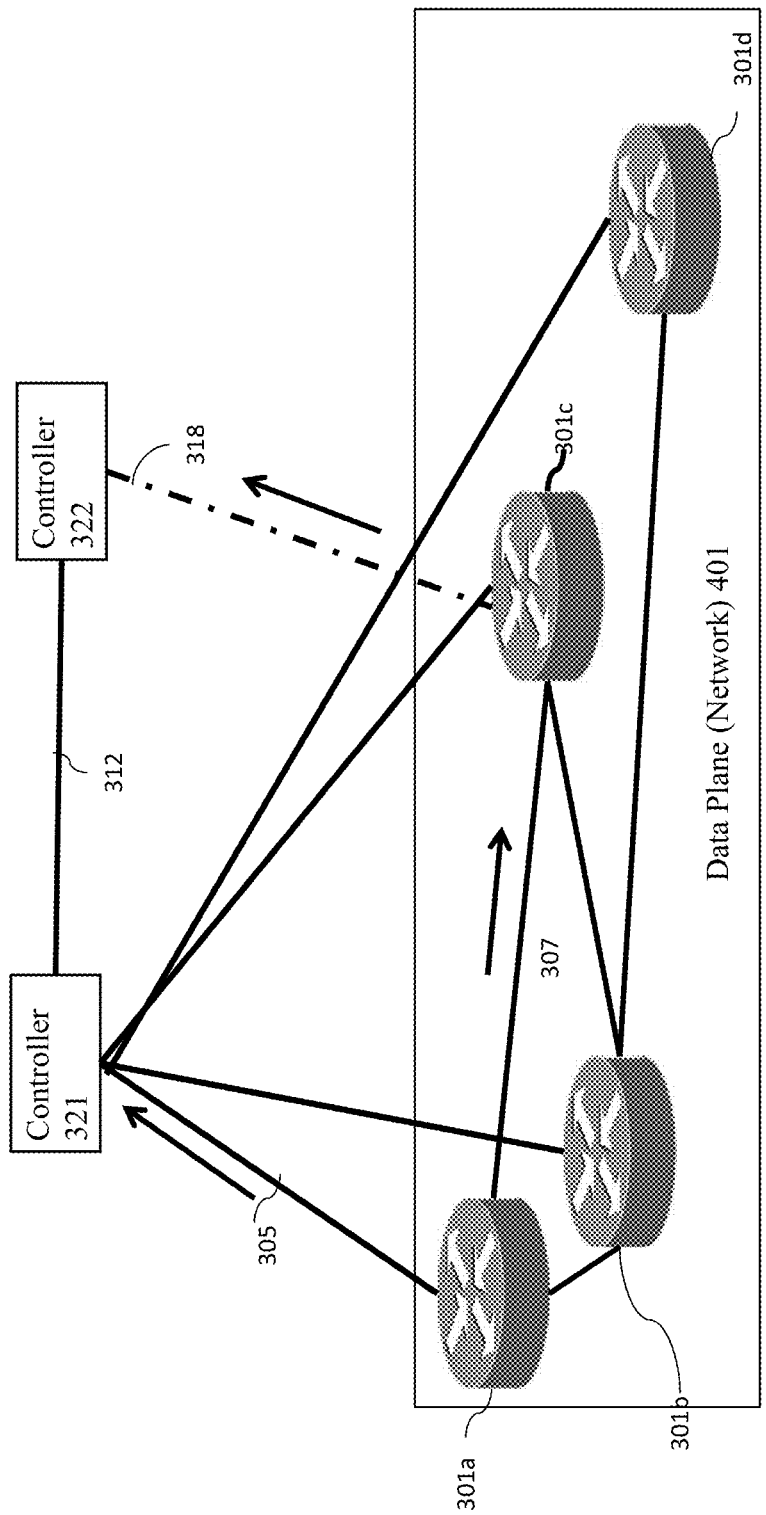
Figure 4D:
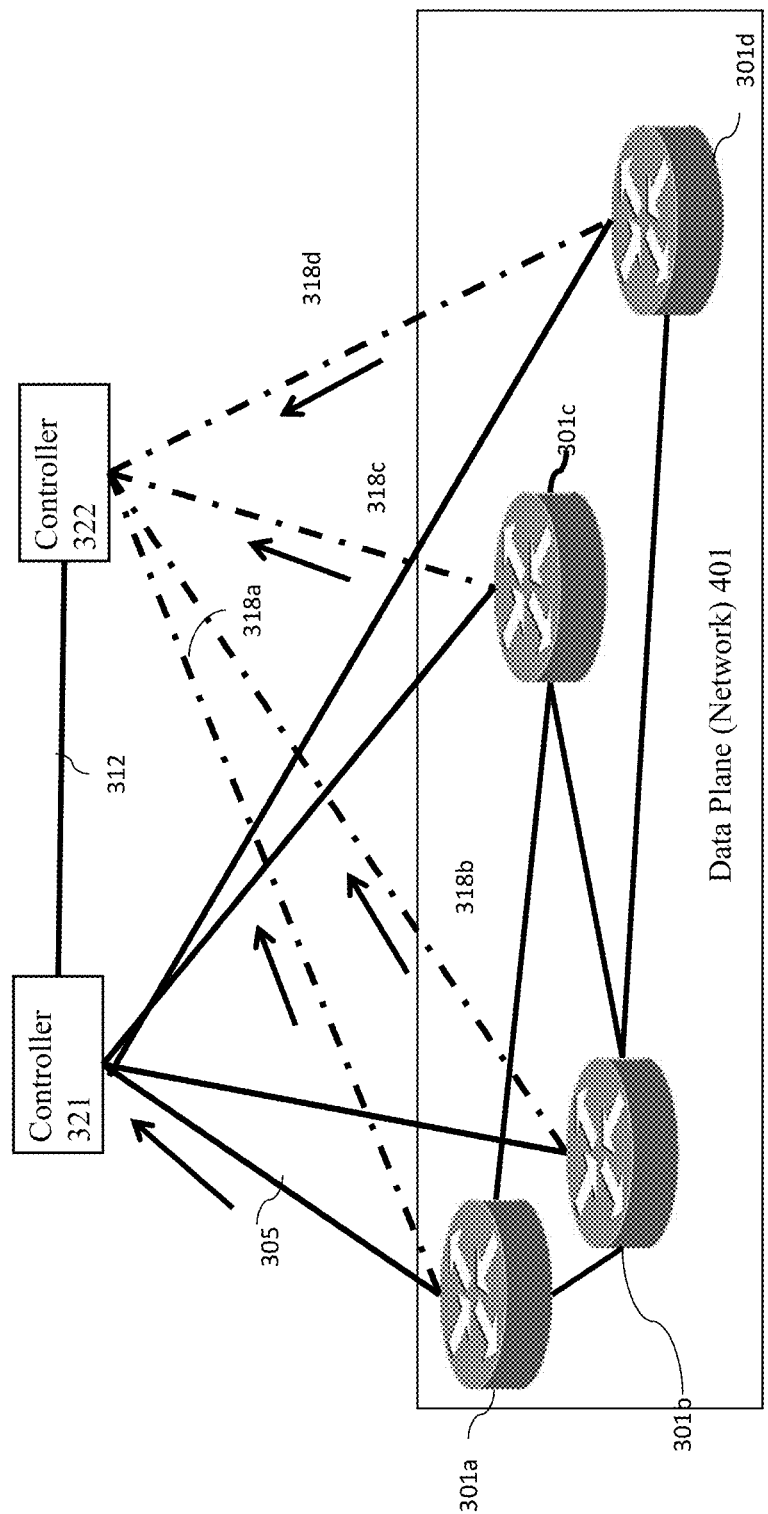

An exemplary control flow table corresponding to the scenario of FIG. 4a is as follows:
{for switch 301a,
all control flows route to controller 322}
An exemplary control flow table corresponding to the scenario of FIG. 4b is as follows:
{for switch 301a,
only DPI flows, route to controller 322, while
all other control flows, route to controller 321}
An exemplary control flow table corresponding to the scenario of FIG. 4c is as follows
{for switch 301a,
only DPI flows, route to switch 301e, while
all other control flows, route to controller 321}
{for switch 301c,
any DPI flows received from switch 301a, route to controller 322}
An exemplary control flow table corresponding to the scenario of FIG. 4d for a service specific controller is as follows
{or all switches,
only specific video flows to controller 322, while
all other control flows, route to controller 321}
Control traffic flow tables are updated and resent to switches at least each time a new controller is created or destroyed, or traffic load has changed.

System Description

Figure 5:
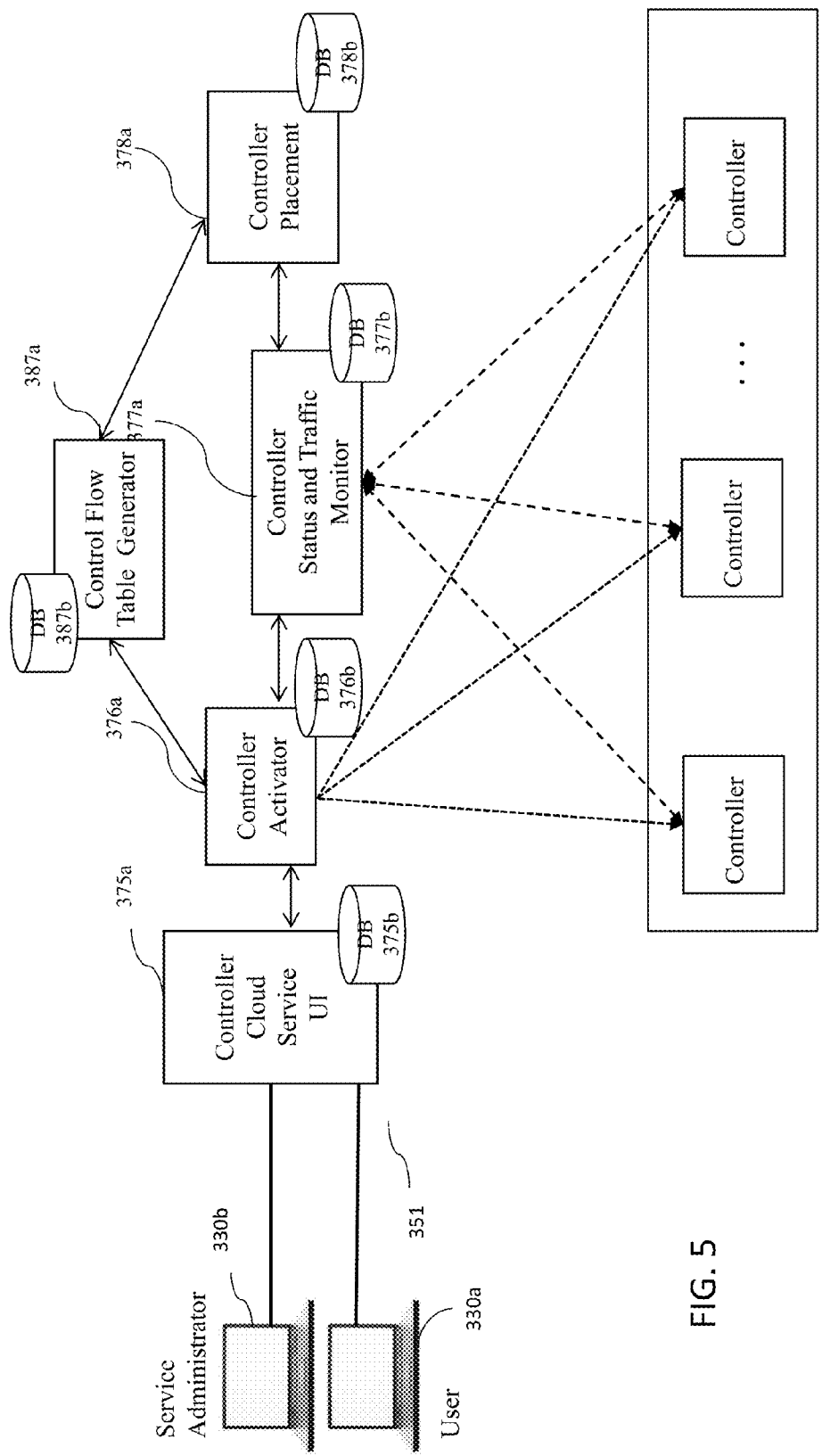
FIG. 5 illustrates a high-level block diagram of components of the system of the present invention.

FIG. 5 illustrates the block diagram of the components of the system of the present invention. Controller Cloud User Interface (UI) 375a is where the service administrators and service users can access the service to view or manage the service elements (we assumed a Cloud service for practical purposes). The User Interface of 375a can reside on computers 330a and 330b, which can access 375a through public Internet or a private network. Database 375b stores information regarding each managed SDN (such as service users' id and passwords, SDN topology, measured network control traffic load, congestion information, performance information, alarms, controller activation and deactivation status, service costs, etc.) One can view sub-systems 375a and 375b as the Provision and Network Management Service (P&NMS) combined. Note that this subsystem is used to subscribe/unsubscribe to the service, pay service bills, and remotely monitor or reconfigure the network. Although we combined such key functions within a single subsystem such as 375a, these functions may be implemented as separate subsystems (e.g., billing, provisioning, NMS, etc.). This block represents an optional component.

Controller Status and Traffic Monitor 377a is the subsystem where controller status is collected from each active controller. Each controller periodically sends information regarding its traffic and processing load to 377a, which can store all or a filtered set of information in database 377b. If a predefined control traffic load threshold is exceeded or there is a manual command from 375a to activate a new controller, Controller Status and Traffic Monitor 377a sends proper information to Controller Placement 378a so that it can make a determination for the best location for the new Controller. Controller Placement 378a stores the topology of the entire control network, locations of data centers and available server capacity and other important decision information in its database 378b. When a request for a new Controller activation is made, it uses such information in a proprietary algorithm to determine the optimal location and capacity for the new server. It communicates such information to Controller Activation subsystem 376a, which in turn activates the new server in the cloud, coordinates with the live controllers so that (1) the new controller is discovered by the other controllers, (2) a new control flow table is generated in 387a and sent to the controllers (to be forwarded to the switches), and (2) the traffic generating the load is shifted from the loaded controller to the new controller according to the new control flow table deployed in the switches. Database 376b contains data related to each activated and deactivated controller in the network. Database 387a contains control flow tables.

Figure 6:
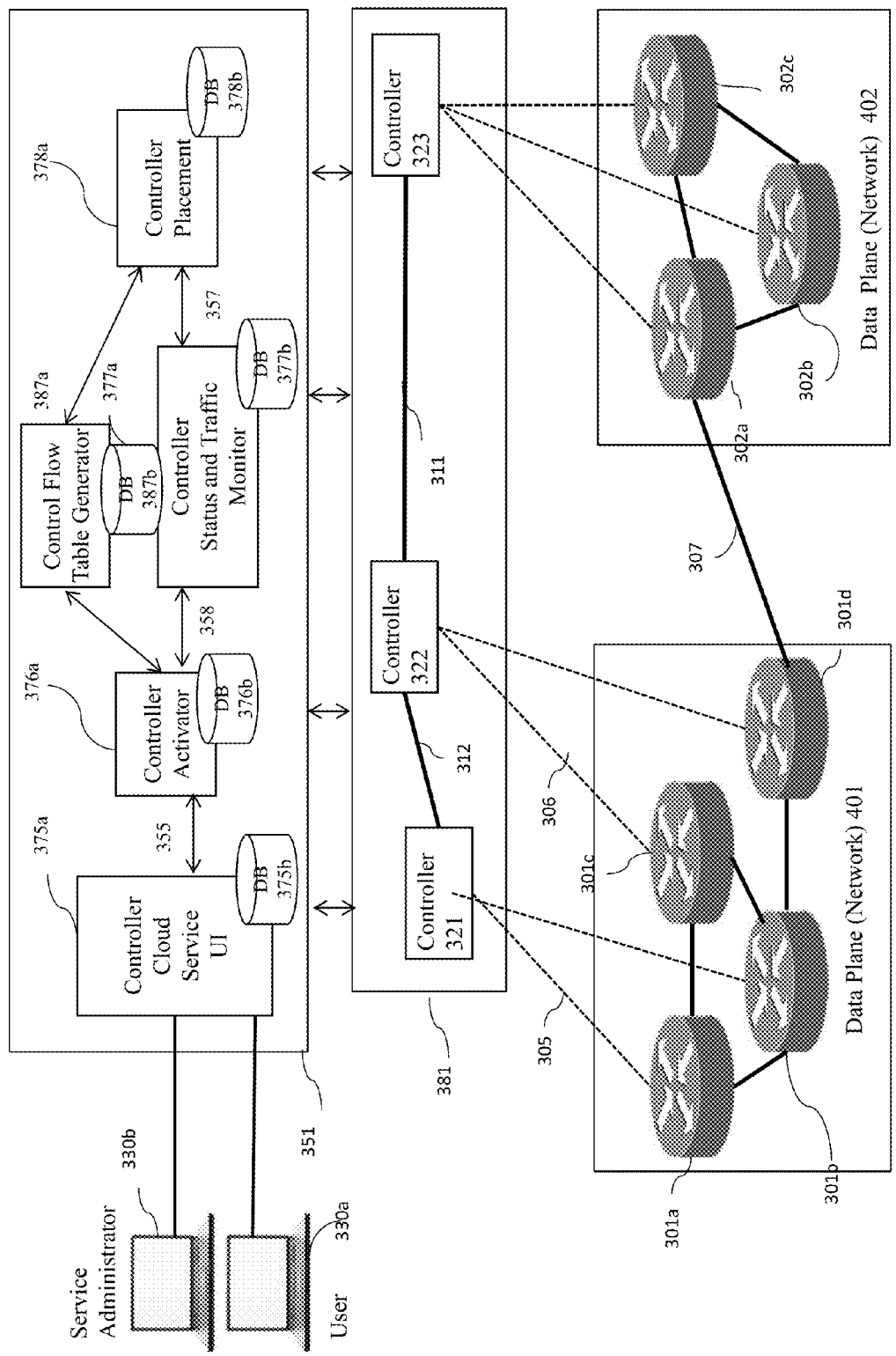
FIG. 6 illustrates the scenario with two SDNs managed by the system of the present invention.

FIG. 6 illustrates the two data networks 401 and 402 controlled by Controllers 321, 322 and 323, which in turn are controlled by the system of the present invention. Note that link 381 is the communications link between the Controllers of SDN and the subsystems of the system. Internal links of the system such as 355-358 enables subsystems of the system to pass around information regarding the service. Although each subsystem is shown as if it is a separate server, they may all reside on the same server, and thereby, links 355-358 may simply be inter-processor links and data of databases 375-378 may reside within the same database.

Figure 7:
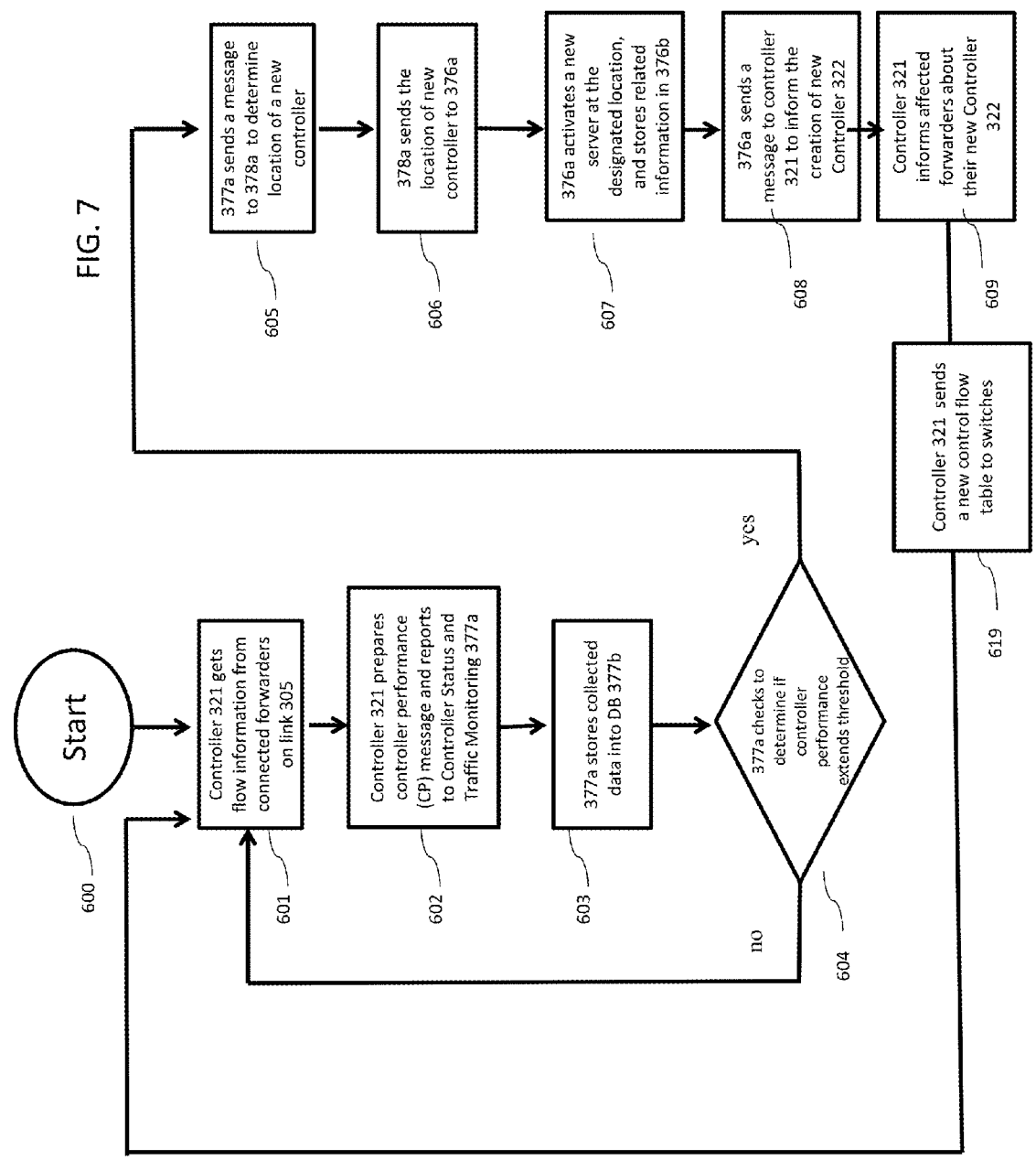
FIG. 7 illustrates an example flowchart outlining the steps of activating a new controller.

FIG. 7 illustrates the flow of process between various components of system 351 to activate a new controller. The process starts at step 600. Controller 321 periodically collects at step 601 performance information from forwarders it is serving using link 305. Once the data is available, in step 602, Controller 321 sends the information to Controller Status and Traffic Monitoring 377a, which in turn stores the information in database 377b in step 603. Simultaneously, 377a checks to determine if the received performance measurements indicate a traffic congestion in step 604. If the answer is 'no', the process loops back to the beginning to continue to monitor the control traffic. If the answer is 'yes', in step 605, 377a sends the relevant information to 378a to enable the determination of location of a new Controller to offload 321. In step 607, 376a activates a server for the new Controller and stores relevant information in database 376b. In step 608, 376a sends a message to Controller 321 about the newly created Controller 322 and consequently a new control flow table. Controller 321 sends new control flow tables in step 619 to affected forwarders regarding switching their controller to 322.

Figure 8:
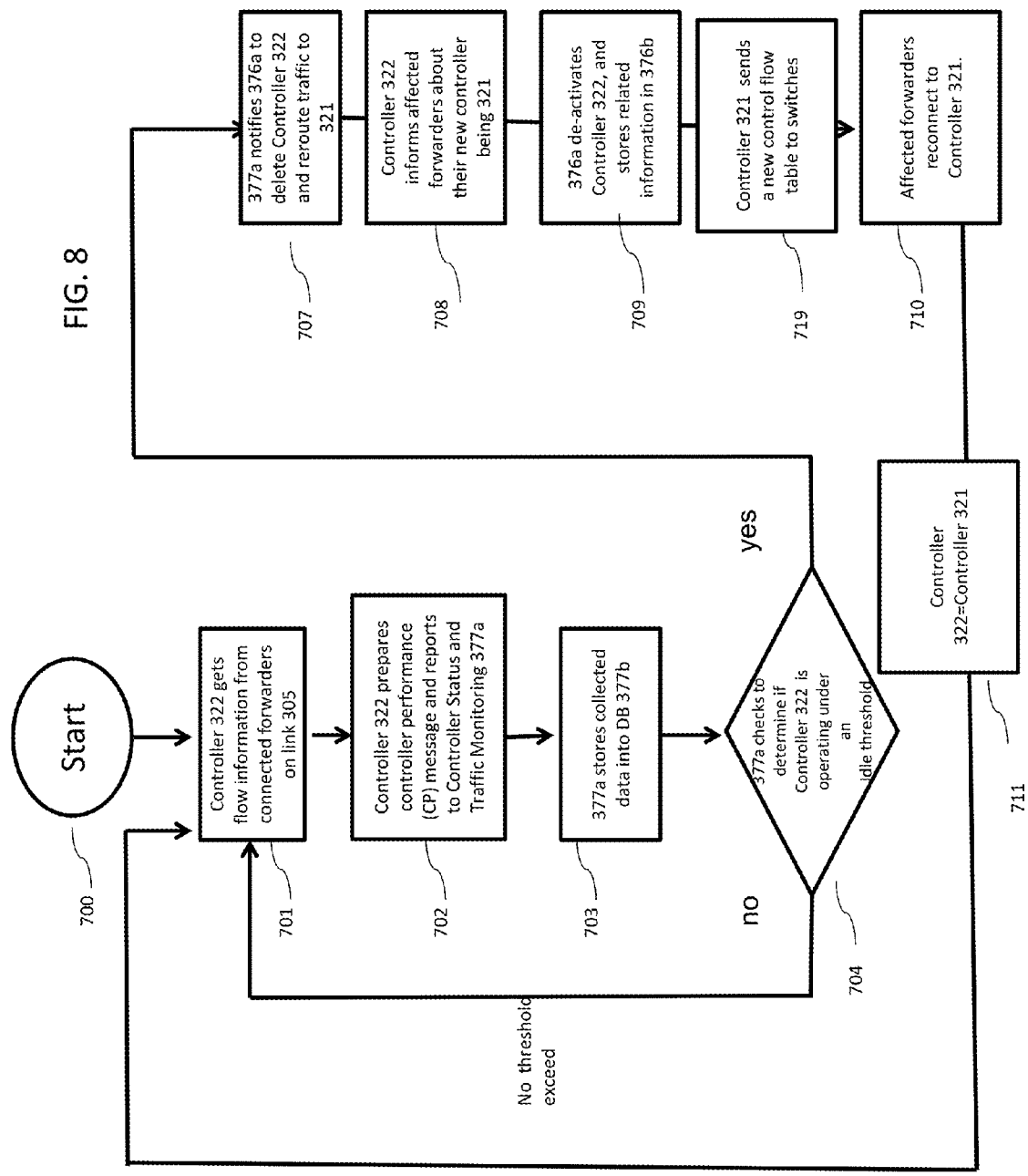
FIG. 8 illustrates an example flowchart outlining the steps of deactivating an existing controller.

FIG. 8 depicts the steps of the process of deactivating an existing Controller when network load is reduced below a threshold. The process starts at step 700. Controller 322 periodically collects at step 701 performance information from forwarders it is serving using link 305. Once the data is available, in step 702, Controller 322 sends the information to Controller Status and Traffic Monitoring 377*a*, which in turn stores the information in database 377*b* in step 703. Simultaneously, 377*a* checks to determine if the received performance measurements indicate an alleviation of traffic congestion in step 704. If the answer is 'no', the process loops back to the beginning to continue to monitor the control traffic on Controller 322. If the answer is 'yes', in step 707, 377*a* sends relevant information to 376*a* to deactivate Controller 322, which in turn sends a messages to affected forwarders in step 708 regarding switching their controller to 321. In step 709, Controller 322 is de-activated. In step 719 a new Controller Flow Table is sent to Controller 321, which is sent to affected forwarders. Thereafter, in step 710, affected forwarders reconnect with previous Controller (321). In step 711, the monitoring of 322 is stopped (i.e., instead, only 321 is being monitored).

Additionally, the present invention provides for an article of manufacture comprising computer readable program code contained within implementing one or more modules to provide control flow management in SDNs. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: when needed, activating a new controller in the SDN; determining a control flow table to assign a control traffic flow group to the new controller in the SDN; sending the control flow table to one or more switches in SDN, and wherein the switches discover the new controller and reroutes control traffic to the new controller according to the control flow table.

Implemented in computer program code based products are software modules for: attaching a switch in the SDN directly to both a first controller and a second controller in the SDN; receiving a control flow routing table at the switch; and temporarily routing a first subset of control flows from the switch to the first controller and temporarily routing a second subset of control flows to the second controller.

Implemented in computer program code based products are software modules for: attaching a first switch in the SDN to a first controller in the SDN; indirectly attaching the first switch to a second controller in the SDN via a second switch; receiving a first control flow routing table at the first switch and a second control flow routing table at the second switch; and routing a first portion of control flows defined in the first control flow routing table from the first switch to the first controller and routing a second portion of control flows defined in the second control flow routing table to the second switch, which in turn routes the second portion of control flows to the second controller.

Implemented in computer program code based products are software modules for: identifying when a switch is disconnected from a first controller; directly reconnecting the switch to a second controller; receiving a control flow routing table at the switch, and sending control flows by the switch to the second controller as defined in the control flow routing table; and identifying when the switch is reconnected to the first controller and disconnecting the switch from the second controller so that only one controller serves the switch.

CONCLUSION

A system and method has been shown in the above embodiments for the effective implementation of a system and method for control flow management in software defined networks. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program or specific hardware.

The invention claimed is:

1. A method to dynamically reconfigure a control plane of a software defined network (SDN) having at least one existing active controller, said method comprising:
   when needed, activating and adding a new controller to said SDN;
   determining a control flow table to assign a control traffic flow group to said new controller in said SDN;
   sending said control flow table to one or more switches in SDN,
   wherein said switches discover said new controller and reroutes control traffic toward said new controller as opposed to said existing active controller according to said control flow table, and
   wherein said control flow table is sent from a database of the existing active controller storing a plurality of control flow tables to said one or more switches.

2. The method of claim 1, wherein said control flow table comprises information regarding which control flow is to be routed to which switch or to which controller in said SDN.

3. The method of claim 1, wherein said control flow table is any of the following: a static control flow table and a dynamic control flow table.

4. The method of claim 1, wherein said switches in said SDN automatically discover newly connected controllers that are assigned to utilize them.

5. The method of claim 1, wherein said new controller is a service specific controller.

6. The method of claim 5, wherein said service specific controller is used to control traffic of any of the following: a video service, firewall service or deep packet inspection (DPI) service.

7. A method to dynamically reconfigure a software defined network (SDN) domain's control plane, said method comprising:
   attaching a switch in said SDN directly to both a first controller and a second controller in said SDN;
   receiving a control flow routing table at said switch;
   temporarily routing a first subset of control flows from said switch to said first controller and temporarily routing a second subset of control flows to said second controller, and
   wherein said control flow table is sent to said switch in said SDN from a database of the first or second controller storing a plurality of control flow tables.

8. The method of claim 7, wherein said control flow table comprises information regarding which control flow is to be routed to which switch in said SDN.

9. The method of claim 7, wherein said control flow table is any of the following: a static control flow table and a dynamic control flow table.

10. The method of claim 7, wherein switches in said SDN automatically discover newly connected controllers that are assigned to utilize them.

11. The method of claim 7, wherein said first controller and/or second controller is a service specific controller.

12. The method of claim 11, wherein said service specific controller is used to control traffic of any of the following: a video service, firewall service or deep packet inspection (DPI) service.

13. A method to dynamically reconfigure a software defined network (SDN) domain's control plane, said method comprising:
  attaching a first switch in said SDN to a first controller in said SDN;
  indirectly attaching said first switch to a second controller in said SDN via a second switch;
  receiving a first control flow routing table at said first switch and a second control flow routing table at said second switch;
  routing a first portion of control flows defined in said first control flow routing table from said first switch to said first controller and routing a second portion of control flows defined in said second control flow routing table to said second switch, which in turn routes said second portion of control flows to said second controller, and
  wherein said first and second control flow tables are sent to said first and second switches, respectively, from a database of the first or second controller storing a plurality of control flow tables.

14. The method of claim 13, wherein said first and second control flow tables comprise information regarding which control flow is to be routed to which switch in said SDN.

15. The method of claim 13, wherein each of said first or second control flow tables are any of the following: a static control flow table and a dynamic control flow table.

16. The method of claim 13, wherein switches in said SDN automatically discover newly connected controllers that are assigned to utilize them.

17. The method of claim 13, wherein said first controller and/or second controller is a service specific controller.

18. The method of claim 13, wherein said service specific controller is used to control traffic of any of the following: a video service, firewall service or deep packet inspection (DPI) service.

19. A method to dynamically reconfigure a software defined network (SDN) domain's control plane, said method comprising:
  identifying when a switch is disconnected from a first controller;
  directly reconnecting said switch to a second controller;
  receiving a control flow routing table at said switch, and
  receiving a control traffic and sending said control traffic by said switch to said second controller as defined in said control flow routing table; and
  identifying when said switch is reconnected to said first controller and disconnecting said switch from said second controller so that only one controller serves said switch.

20. A method to dynamically reconfigure a software defined network (SDN) domain's control plane, said method comprising:
  a first controller determining a control flow table;
  said first controller sending control flow table to a second controller;
  receiving a control flow routing table at said second controller, and
  receiving a control traffic by said second controller and rerouting said control traffic to said first controller as defined in said control flow routing table.

21. The method of claim 20, wherein said first controller is a service specific controller.

* * * * *